United States Patent
Ayukawa

(10) Patent No.: US 9,164,521 B2
(45) Date of Patent: Oct. 20, 2015

(54) POWER SUPPLY UNIT, SEMICONDUCTOR DEVICE, AND WIRELESS COMMUNICATION DEVICE

(71) Applicant: Renesas Electronics Corporation, Kawasaki-shi, Kanagawa (JP)

(72) Inventor: Kazuhito Ayukawa, Itami (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 160 days.

(21) Appl. No.: 13/958,594

(22) Filed: Aug. 4, 2013

(65) Prior Publication Data

US 2014/0057575 A1    Feb. 27, 2014

(30) Foreign Application Priority Data

Aug. 22, 2012   (JP) ................................ 2012-183027

(51) Int. Cl.
 *G06F 1/26*   (2006.01)
 *G05F 1/10*   (2006.01)
(52) U.S. Cl.
 CPC ......................................... *G05F 1/10* (2013.01)
(58) Field of Classification Search
 CPC ............ G06F 1/26; H04B 5/0037; G05F 1/10
 See application file for complete search history.

(56) References Cited

U.S. PATENT DOCUMENTS

| | | | |
|---|---|---|---|
| 7,701,181 B2 | 4/2010 | Inoue | |
| 2002/0041178 A1* | 4/2002 | Hiraki et al. | 323/272 |
| 2003/0067289 A1* | 4/2003 | Morita | 323/282 |
| 2005/0094341 A1* | 5/2005 | Hachiya | 361/93.1 |
| 2005/0242791 A1* | 11/2005 | Rajapandian et al. | 323/268 |
| 2008/0272889 A1* | 11/2008 | Symons | 340/10.1 |
| 2009/0206813 A1* | 8/2009 | Agari et al. | 323/282 |
| 2010/0214082 A1* | 8/2010 | Covaro et al. | 340/310.12 |
| 2011/0018340 A1* | 1/2011 | Patterson | 307/10.1 |
| 2011/0130093 A1* | 6/2011 | Walley et al. | 455/41.1 |
| 2012/0119841 A1* | 5/2012 | Kitamura | 332/103 |
| 2014/0126254 A1* | 5/2014 | Al-Shyoukh et al. | 363/49 |

FOREIGN PATENT DOCUMENTS

JP      2008-061452 A    3/2008

* cited by examiner

*Primary Examiner* — Andrew Wendell
*Assistant Examiner* — Cindy Trandai
(74) *Attorney, Agent, or Firm* — Miles & Stockbridge P.C.

(57) ABSTRACT

The present invention realizes stabler output voltage variable control in a power supply unit. A power supply unit capable of changing dynamic output voltage has: a first regulator for dropping down voltage, by a switching method and outputting the resultant voltage to a first node; and a second regulator for dropping down the input voltage by a voltage drop and outputting the resultant voltage to the first node. In the case where a target voltage instructed by first information is larger than a predetermined threshold voltage, the power supply unit controls so that the voltage of the first node becomes the target voltage and stops supply of voltage from the second regulator. In the case where the target voltage is smaller than the predetermined threshold voltage, the power supply unit controls the second regulator so that the voltage of the first node becomes the target voltage and stops output of voltage from the first regulator.

12 Claims, 6 Drawing Sheets

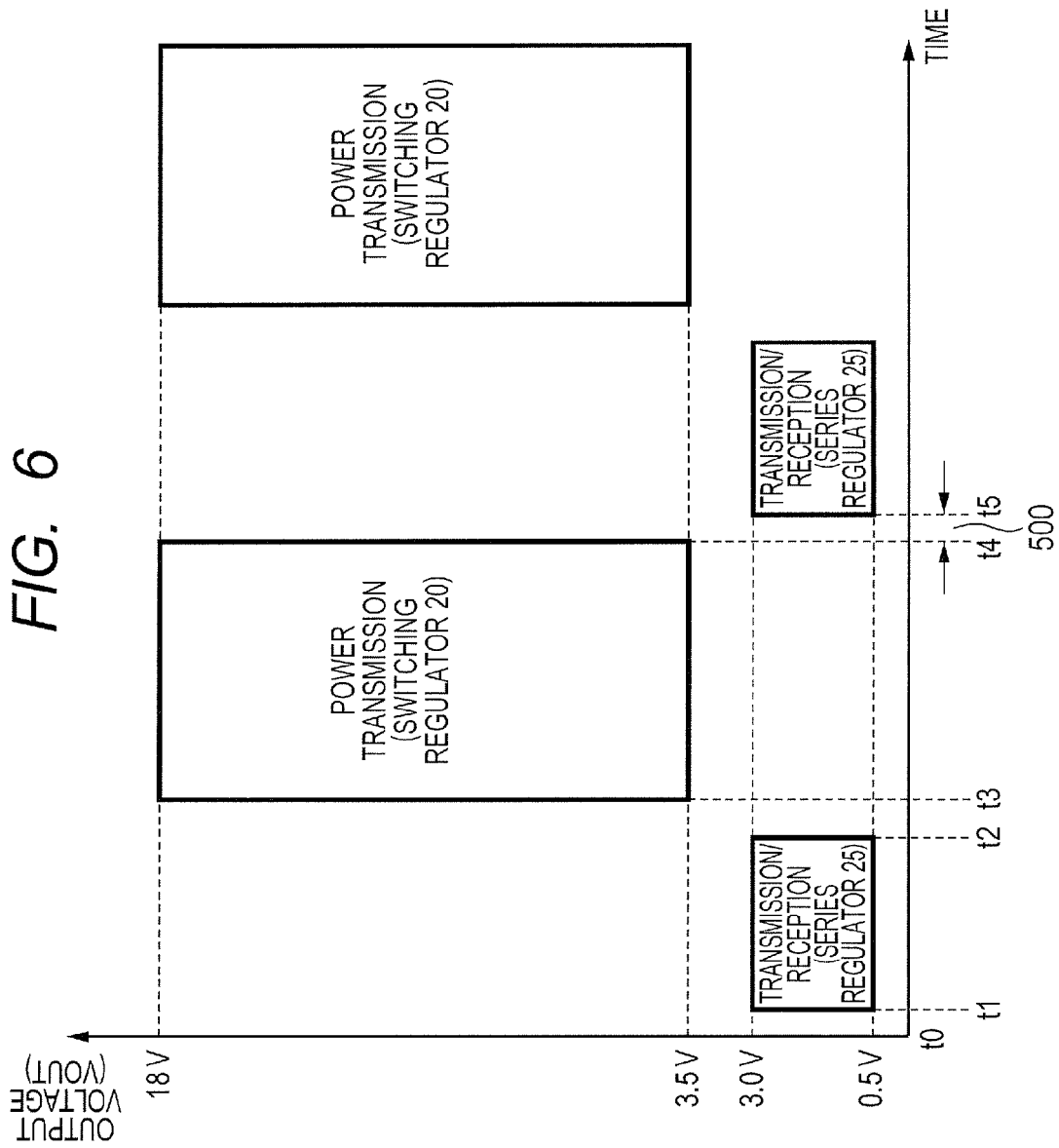

POWER SUPPLY UNIT, SEMICONDUCTOR DEVICE, AND WIRELESS COMMUNICATION DEVICE

CROSS-REFERENCE TO RELATED APPLICATIONS

The disclosure of Japanese Patent Application No. 2012-183027 filed on Aug. 22, 2012 including the specification, drawings and abstract is incorporated herein by reference in its entirety.

BACKGROUND

The present invention relates to a power supply unit for generating voltage, a semiconductor device for controlling the power supply unit, and a wireless communication device to which the power supply unit is applied and, more specifically, to a technique effectively applied to a power supply unit having a function of varying voltage to be output.

In recent years, a wireless power supply system for supplying power in a noncontact (wireless) manner is being spread. For example, a wireless power supply system of an electromagnetic induction method using electromagnetic induction between coils arranged apart from each other is included by a transmission-side device transmitting power and a reception-side device receiving the transmitted power, and a small-sized portable terminal device as the reception-side device can, for example, charge a battery on the basis of power received. As a standard related to the noncontact communication technique of transmitting information by radio, NFC (Near Field Communication) is known. A small portable terminal device conformed to the NFC standard In recent years, a wireless power supply system performing power transmission and communication for transmitting information while switching them by commonly using an antenna used for NFC and an antenna used for wireless power transmission of an electromagnetic resonance method is being developed. At the time of performing communication for transmitting information, a transmission-side device in such a wireless power supply system generates a drive signal having relatively small amplitude, by a drive circuit and transmits a signal by driving the antenna. At, the time of transmitting power the device generates a drive signal having a large amplitude by the drive circuit and transmits a signal by driving the antenna. To generate drive signals having different amplitudes for the power transmission and information communication by a single drive circuit in the transmission-side device, for example, a power supply unit capable of varying the power supply voltage to be supplied to the drive circuit is necessary.

As the power supply unit, conventionally, a switching regulator and a series regulator are known. In addition, a power supply unit for supplying power to a load while selectively switching an output from a switching regulator and an output from a series regulator is known. For example, patent literature 1 discloses a technique related to a power supply unit realizing reduced current consumption at the time of a light load by switching any of output voltages of an LDO (Low Drop Out) regulator as a linear regulator and a switching regulator in accordance with load current and outputting the voltage.

BACKGROUND ART LITERATURE

Patent Literature

Patent Literature 1: Japanese Unexamined Patent Publication No. 2008-61452

SUMMARY

Problems to be Solved by the Invention

The inventors of the present invention have examined usage of a switching regulator of varying output voltage within a predetermined voltage range as a power supply unit to be applied to a transmission-side device in a wireless power supply system. However the following was made apparent. In a switching regulator, when an input/output potential difference changes the duty ratio of a signal for driving a switching element changes, and the frequency characteristic of a feedback loop of the power supply unit changes. Consequently, when a fluctuation range of the input/output potential, difference is large, it is extremely difficult to perform stable control under all of input/output conditions. The technique described in the patent literature is a technique for dealing with a load fluctuation in the case of outputting a fixed voltage, and the case of varying output voltage and the case where the input/output voltage difference changes are not considered.

Means and the like for solving such problems will be described hereinafter. The other subject and novel features will become apparent from the description of the specification and the appended drawings.

Outline of a typical embodiment disclosed in the specification will be briefly described as follows.

A power supply unit capable of changing dynamic output voltage has: a first regulator for dropping down input voltage by a switching method and outputting, the resultant voltage to a first node; and a second regulator for dropping down the input voltage by a voltage drop and outputting the resultant voltage to the first node. In the case where a target voltage instructed by first information is larger than a predetermined threshold voltage, the power supply unit controls so that the voltage of the first node becomes the target voltage and stops supply of voltage from the second regulator. In the case where the target voltage smaller than the predetermined threshold voltage the power supply unit controls the second regulator so that the voltage of the first node becomes the target voltage and stops output of voltage from the first regulator.

Effect of the Invention

An effect obtained by the typical embodiment disclosed in the specification will be briefly described as follows.

That is, the power supply unit can perform stabler variable control on output voltage.

BRIEF DESCRIPTION OF THE DRAWINGS

FIG. 6 is an explanatory diagram illustrating communication timings at the time of wireless power supply in a wireless power supply system 100.

DETAILED DESCRIPTION

1. Outline of Embodiments

Figure 1:
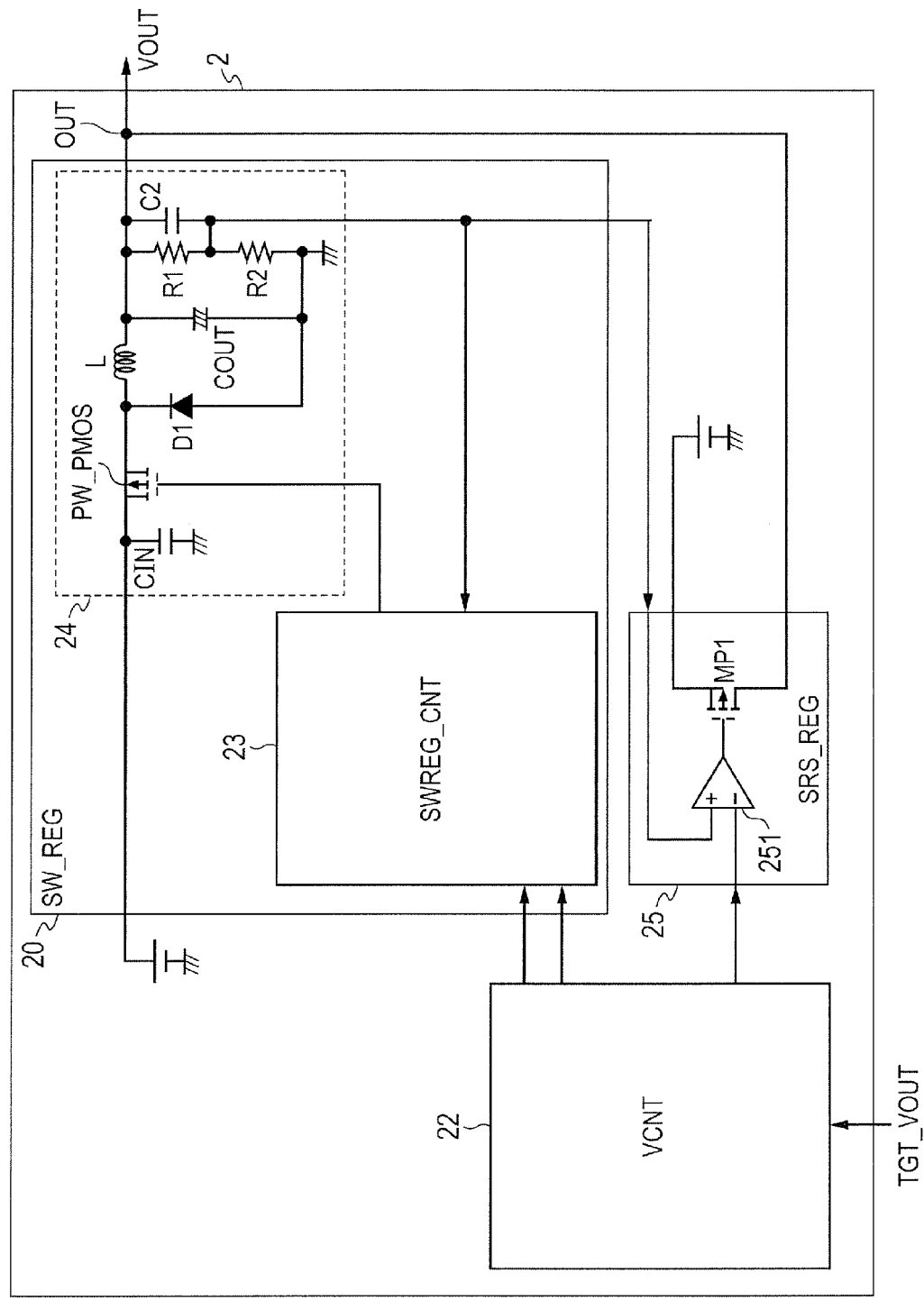
FIG. 1 is a block diagram illustrating a power supply unit as an embodiment of the present invention.

First, outline of typical embodiments disclosed in the application will be described. Reference numerals in the diagrams referred to in parenthesis in description of outline of embodiments merely indicate members included in the concept of the components to which the reference numerals are designated.

[1] Power Supply Unit which Switches Between Switching Method and Series Method in Accordance with Magnitude of Voltage to be Output A power supply unit (2) according to a typical embodiment of the present invention is capable of changing dynamic output voltage (VOUT) as illustrated in FIG. 1. The power supply unit has a first node (OUT) for outputting the output voltage; a first regulator (20) for dropping down input voltage, by a switching method and outputting the resultant voltage to the first node; and a second regulator (25) for dropping down the input voltage by a voltage drop and outputting the resultant voltage to the first node. The power supply unit further includes an output voltage control unit (22) for controlling the first and second regulators in accordance with first information (TGT_VOUT) instructing target voltage of the output voltage. In the case where the target voltage instructed by the first information is larger than a predetermined threshold voltage the output voltage control unit controls the first regulator so that the voltage of the first node becomes the target voltage and stops supply of voltage from the second regulator. In the case where the target voltage is smaller than the predetermined threshold voltage, the output voltage control unit controls the second regulator so that the voltage of the first node becomes the target voltage and stops supply of voltage from the first regulator.

When a fluctuation of an input/output potential different is large, it is difficult for the switching regulator to perform stable control under all of input/output conditions. The power supply unit generates a voltage by the first regulator of the switching method in a range where the input/output potential difference is small, and generates a voltage by the second regulator of the series method in a range where the input/output potential difference is large, so that a stabler output voltage variable control can be performed.

[2] (Stop of Output of Series Regulator: Clamping of Reference Voltage of Regulator In the power supply unit of [1], the second regulator includes: an output transistor (MP1) supplying current to the first node; and an error amplifier (251) receiving a feedback voltage (VFB) and a reference voltage (VREF2) based on the voltage of the first node and controlling current supply by the output transistor so that an error between the two input voltages decreases. The output voltage control unit generates the reference voltage according to a voltage lower than the target voltage in the case where the instructed target voltage is larger than the predetermined threshold voltage, and generates the reference voltage according to the target voltage in the case where the instructed target voltage is smaller than the predetermined threshold voltage.

With the configuration, switching between stop of the voltage supply from the second regulator and restart of voltage supply from the second regulator can be easily controlled. Since operation of the error amplifier or the like is not stopped to stop the voltage supply from the second regulator, time since the supply source of the output voltage is switched from the first regulator to the second regulator until the output voltage is stabilized can be shortened.

[3] Two Different Input Voltages

In the power supply unit of [1] or [2], the first regulator drops a first input voltage (VIN1) and outputs the resultant voltage, and the second regulator drops a second input voltage (VIN2) lower than the first input voltage and outputs the resultant voltage.

With the configuration, the voltage drop amount in the second regulator can be decreased, so that efficient at the time of voltage supply from the second regulator can be improved.

[4] Backflow Prevention Diode

In the power supply unit of [3], the second regulator outputs a voltage to the first node via a diode (D2) which is biased in a forward direction.

With the configuration, even in the case where the output voltage is higher than the second input voltage at the time of supplying voltage from the first regulator, backflow of current to a node to which the second input voltage is supplied from the first node via the second regulator can be prevented. In the case of using a switching element such as a transistor, a control signal for controlling the switch element or the like is necessary. In the above, such a control signal is unnecessary, so that the circuit configuration can be simplified.

[5] Upper Limit Value of Reference Voltage of Series Regulator: Threshold Voltage In the power supply unit of any of [1] to [4], in the case where the instructed target voltage is larger than the predetermined threshold voltage, the output voltage control unit generates the reference voltage according to the predetermined threshold voltage.

With the configuration a reference voltage based on which the voltage supply from the second regulator stops in the case where the instructed target voltage is larger than the predetermined threshold voltage can be easily generated.

[6] Stop of Switching Regulator: Turn Off of Switching Element

In the power supply unit in any of [1] to [5], the first regulator includes: a voltage converter circuit (24) controlling current to be supplied to an inductor (L) by a switching element (PW_PMOS) to thereby generate a voltage lower than an input voltage and output the resultant voltage; and a switching control unit (23) controlling an on/off state of the switching element. The output voltage control unit controls the switching control unit so as to turn off the switching element to thereby stop output of voltage from the first regulator.

With the configuration, voltage supply from the first regulator can be easily stopped.

[7] Wireless Communication Device

A wireless communication device (101) as a typical embodiment of the present invention is capable of performing communication by switching transmission/reception of data and power transmission. The wireless communication device has: an antenna (5); a drive circuit (3) generating a drive signal for driving the antenna; a matching circuit (4) for impedance matching between the antenna and an antenna on a reception device side; a power supply unit in any of [1] to [6]; and a data process control unit (1 for controlling the communication. In the case of transmitting data via the antenna, the data process control unit supplies the first information (TGT_VOUT)

instructing a target voltage smaller than the predetermined threshold voltage to the power supply unit. In the case of transmitting power via the antenna, the data process control unit gives the first information instructing a target voltage larger than the predetermined threshold voltage to the power supply unit. The drive circuit generates the drive signal according to the voltage output from the power supply unit.

With the configuration, at the time of switching between transmission/reception of data and transmission of power, stabler output voltage variable control by the power supply unit can be performed. At the time of transmitting/receiving data, the drive signal is generated on the basis of output voltage from the second regulator which is not of the switching method. Consequently, there is no possibility that a transmission/reception signal is subject to the influence of switching noise, and it contributes to realize stable data communication.

[8] Microcontroller

In the wireless communication of [7], the data process control unit includes a microcontroller.

[9] Power Supply Control IC

A semiconductor device (21) as a typical embodiment of the present invention has: a switching control unit (23) generating a control signal (VGD) for controlling an on/off state of a switching circuit (PW_PMOS) in a step-down-type switching regulator (20); a series regulator; and a series regulator (25). The semiconductor device further includes an output voltage control unit (22) controlling the switching control unit and the series regulator in accordance with first information (TGT_VOUT) instructing a target voltage to be output. In the case where the target voltage instructed by the first information is larger than a predetermined threshold voltage, the output voltage control unit generates the control signal so that output voltage of the switching regulator becomes the target voltage and stops supply of voltage from the series regulator. In the case where the target voltage is smaller than the predetermined threshold voltage, the output voltage control unit controls the series regulator so that output voltage of the series regulator becomes the target voltage and stops generation of voltage by the switching regulator.

The semiconductor device can be, for example, applied as a control unit for performing a control to make the output voltage vary in a power supply unit which outputs voltage generated by any of plurality of regulators as output voltage. With the configuration, in a manner similar to [1], in a range where the input/output potential difference is small, voltage is generated by the switching regulator. In a range where the input/output potential difference large, voltage is generated by the series regulator. Consequently, stabler output voltage variable control in the power supply unit can be realized.

[10] Stop of Output of Regulator: Clamping of Reference Voltage of Regulator

In the semiconductor device of [9], the series regulator includes an output transistor (MP1) driving a load; and an error amplifier (251) receiving a feedback voltage (VFB) according to the output voltage and a reference voltage (VREF2) and controlling the output transistor so that an error between the two input voltages decreases. The output voltage control unit generates the reference voltage according to a voltage lower than the target voltage in the case where the instructed target voltage is larger than the predetermined threshold voltage, and generates the reference voltage according to the target voltage in the case where the instructed target voltage is smaller than the predetermined threshold voltage.

With the configuration, in a manner similar to [2], switching between stop and restart of voltage supply from the second regulator can be easily controlled, and time since the supply source of output voltage is switched from the first regulator to the second regulator until the output voltage becomes stable can be shortened.

[11] Upper Limit Value of Reference Voltage of Series Regulator: Threshold Voltage In the semiconductor device of [10], in the case where the instructed target voltage is larger than the predetermined threshold voltage, the output voltage control unit generates the reference voltage according to the predetermined threshold voltage.

With the configuration, in the case where the instructed target voltage, is larger than the predetermined threshold voltage, a reference voltage based on which voltage supply from the second regulator stops can be easily generated.

[12] Two Different Input Voltages

In the semiconductor device in any of [9] to [11], the series regulator drops a voltage (VIN2) lower than an input voltage (VIN1) of the switching regulator and outputs the resultant voltage.

With the configuration, a voltage drop amount in the series regulator can be decreased, so that the efficiency at the time of supplying voltage from the series regulator can be improved.

2. Details of Embodiments

The embodiments will be described more specifically.

First Embodiment

Figure 2:
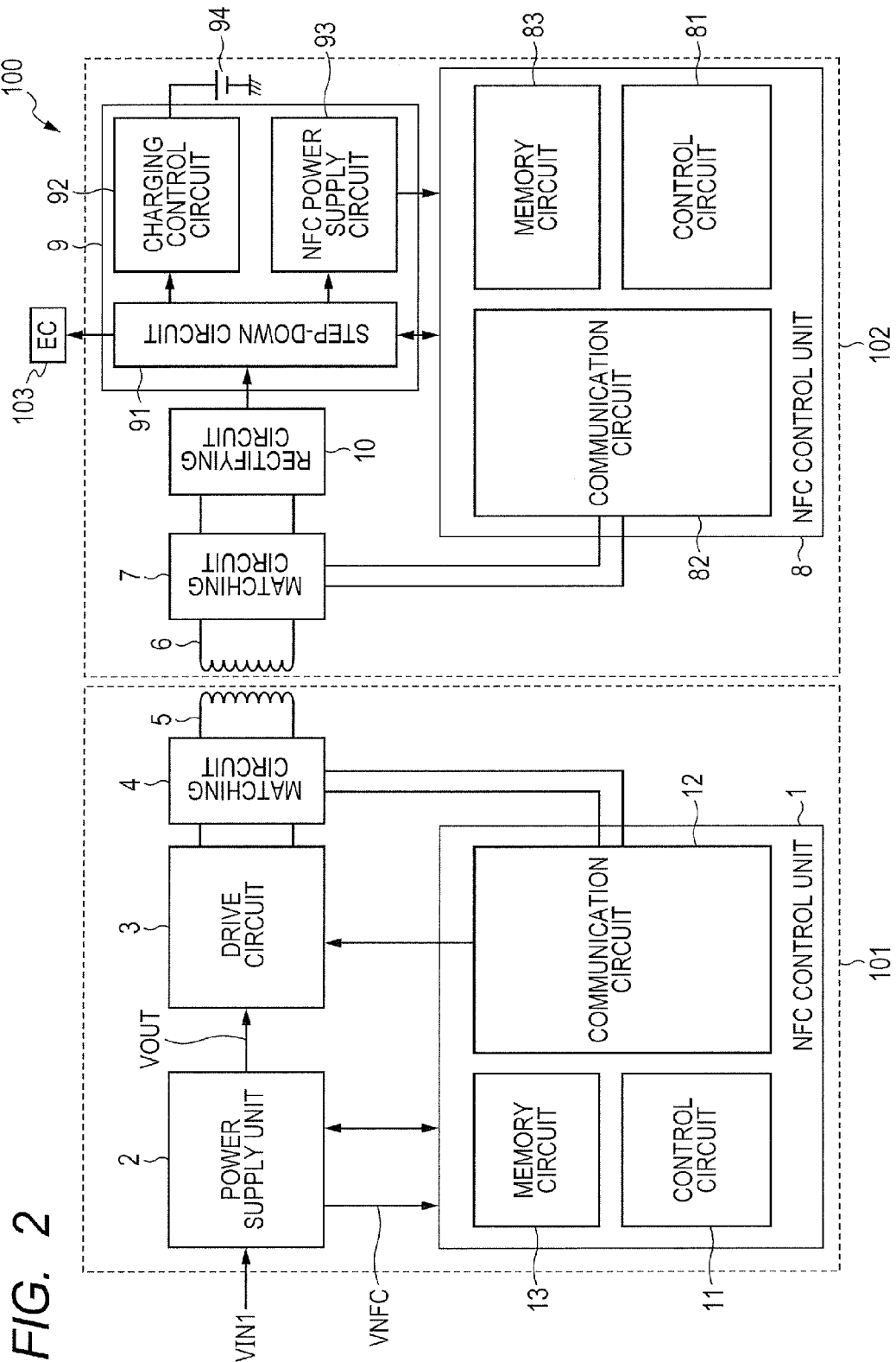
FIG. 2 is a block diagram illustrating a wireless charging system including a wireless communication device in a first embodiment.

FIG. 2 illustrates a wireless charging system including a wireless communication device in a first embodiment. A wireless charging system 100 illustrated in the diagram includes transmission-side wireless communication device (hereinbelow, called "transmission-side device") 101 and a reception-side wireless communication device (hereinbelow, called "reception-side device") 102. In the wireless charging system 100, data can be transmitted/received mutually between the transmission-side device 101 and the reception-side device 102 by near field communication (NFC). In the wireless charging system 100, power can be supplied in a noncontact (wireless) manner from the transmission-side device 2 to the reception-side device 3.

The transmission-side device 101 includes, for example, an NFC control unit 1, a power supply circuit 2, a drive circuit 3, a matching circuit 4, and an antenna 5. The NFC control unit 1 performs overall control for communication with the reception-side device 102. For example, the NFC control unit 1 controls switching between NFC and wireless transmission of power and performs various processes for transmitting/receiving data in the NFC. The NFC control unit 1 is formed by, although not limited, a microcomputer having the NFC function and includes, for example, the control circuit 11, the memory circuit 13, and the communication circuit 12. The control circuit 11 is formed by, for example, a central processing unit (CPU) and executes predetermined programs for wireless power supply and the NFC. As the details will be described later, the control unit 11 outputs information TGT_VOUT (hereinbelow, also called set voltage information) instructing target voltage of the output voltage VOUT of the power supply circuit 2 at the time of transmitting power and at the time of NFC, thereby instructing, the power supply circuit 2 to generate the output voltage VOUT adapted to the power transmission and the NFC. A memory circuit 252 includes, for example, a ROM (Read Only Memory) and a RAM (Random Access Memory). In the ROM, for example, a program executed by the central processing unit is stored.

The RAM is used as a work area for an arithmetic process performed in the central processing unit. The communication circuit 12 performs NFCC with the reception-side device 102 via the antenna 5. For example, at the time of receiving a signal in the NFC, the communication circuit 12 receives a signal transmitted from the reception-side device 102 by the antenna and takes the reception signal into the NFC control unit 1 via the matching circuit 4. At the time of transmitting a signal in the NFC, the NFC control unit 1 supplies data to be transmitted to the drive circuit 3 and the drive circuit 3 drives the antenna 5 in accordance with the received data, thereby generating a transmission signal.

The matching circuit 4 is a circuit for performing impedance matching between the antenna 5 and the antenna 6 on the reception-side device 102 and is, for example, coupled in parallel to the antenna 5 to form a resonance circuit. The antenna 5 is a shared antenna for performing power transmission and transmission/reception of a signal by the NFC and is, for example, a coil antenna.

The drive circuit 3 generates a drive signal for driving the antenna 5. For example, the drive circuit 3 generates a drive signal in accordance with data to be transmitted which is given from the communication circuit 12 at the time of transmitting a signal in the NFC and generates a drive signal according to the magnitude of power to be supplied at the time of transmitting power. By the drive signal, the antenna 5 is excited. The drive circuit 3 operates using the output voltage VOUT which is output from the power supply circuit 2 as a power supply. As the details will be described later, the amplitude of the drive signal generated by the drive circuit 3 is determined by the magnitude of the output voltage VOUT of the power supply circuit 2.

The power supply circuit 2 generates, for example, a plurality of voltages as operation power supplies of function units in the transmission-side device 101 on the basis of the input voltage VIN1 supplied from a power supply adapter, a universal serial bus (USB), or the like. For example, the power supply circuit 2 generates the voltage VOUT as the operation power supply of the drive circuit 3 and voltage VNFC as the operation power supply of the NFC control unit 1. The details of the power supply circuit 2 will be described later.

The reception-side device 3 includes, for example, an antenna 6, a matching circuit 7, a rectifying circuit 10, a power supply unit 9, a battery 94 and an NFC control unit 8. The antenna 6 generates electromotive force (AC signal) by resonant action generated by the antenna 5 of the transmission-side device 101 and transmits/receives a signal related to the NFC. The matching circuit 7 is coupled in parallel to the antenna 6 to form a resonance circuit. The rectifying circuit 10 rectifies the AC signal obtained via the antenna 6. The power supply unit 9 supplies on the basis of the output voltage of the rectifying circuit 10, a power supply voltage for operation to an electronic circuit (EC) 103 as a load circuit for a small portable terminal device (such as smartphone), a charging voltage to the battery 94, a power supply voltage for operation to the NFC control unit 8, and the like. The battery 94 is, although not limited, a one-cell battery (4.0V to 4.2V) and is, for example, a lithium-ion battery. The power supply unit 9 includes a step-down circuit 91, a charging control circuit 92, and an NFC power supply circuit 93. The step-down circuit 91 drops the output voltage of the rectifying circuit 10. The charging control circuit 92 charges the battery 94 on the basis of an output voltage of the step-down circuit 91. The NFC power supply circuit 93 generates a power supply voltage for operation of the NFC control unit 8. A reception signal in the NFC is stored in the NFC control unit 8 via the matching circuit 7. The NFC control unit 8 is formed by, although not limited, a microcomputer and includes a communication circuit 82, a memory circuit 83, and a control circuit 81. The communication circuit 82 performs the NFC via the antenna 6. The control circuit 81 is formed by a central processing unit (CPU) and executes a predetermined program for the NFC. The memory circuit 83 includes, for example, a ROM and an RAM. In the ROM, a program executed by the central processing unit is stored. The RAM is used as a work region of computing process performed by the central processing unit.

The wireless power supply by the transmission-side device 101 will not be described.

The transmission-side device 101 realizes wireless power supply by, for example, performing communication while alternatingly switching between transmission of power and the NFC. Concretely, in the case of transmitting power, the control circuit 11 in the NFC control unit 1 supplies setting voltage information TGT_VOUT instructing a first target voltage to the power supply circuit 2 and instructs generation of a drive signal according to power transmission to the drive circuit 3. On the other hand, in the case of transmitting data by the NFC, the control circuit 11 supplies the setting voltage information TGT_VOUT instructing a second target voltage to the power supply circuit 2 and instructs generation of a drive signal according to data to be transmitted to the drive circuit 3. The first target voltage is, for example, a voltage in a range of 3.5V to 18V, and the second target voltage is, for example, a voltage within a range of 0.5V to 3.0V. As described above the amplitude of the drive signal of the drive circuit 3 is determined according to the magnitude of the output voltage VOUT. Consequently, at the time of the NFC, a transmission signal of relatively small power is transmitted to the reception side device 102, and at the time of transmitting power, a transmission signal of relative large power is transmitted to the reception-side device 102.

The NFC control unit 1 obtains information related to the residual amount of the battery 94 of the reception-side device 102 (hereinbelow, also called battery residual amount information) or the like by the NFC. The NFC control unit 1 adjusts the magnitude of power to be transmitted on the basis of the obtained battery residual amount information. For example, in the case where the residual amount of the battery 94 of the reception-side device 102 is small, the NFC control unit 1 controls the power supply, circuit 2 so as to transmit larger power. In the case where the residual amount of the battery 94 is larger, the NFC control unit 1 controls the power supply circuit 2. For example, when it is determined that the residual amount of the battery 94 is small from the battery residual amount information obtained by the NFC, the NFC control unit 1 supplies the setting voltage information TGT_VOUT instructing, for example, 18V as a target voltage to the power supply circuit 2. The power supply circuit 2 generates the output voltage VOUT of 18V and the drive circuit 3 generates a drive signal according to 18V. In such a manner, a transmission signal of a large power amount is transmitted from the antenna 5. After that, acquisition of the battery residual amount information by the NFC and power transmission are repeatedly performed. When it is determined that the battery 94 is close to full charge, the NFC control unit 1 supplies the setting voltage information TGT_VOUT instructing, for example, 3.5V as a target voltage to the power supply circuit 2. In such a manner, the output voltage VOUT of 3.5V is generated by the power supply circuit 2, and a transmission signal of a small power amount is transmitted from the antenna 5. By adjusting the amount of power transmitted according to the battery residual amount as described above, the charging control on the battery 94 can be performed efficiently.

The power supply circuit 2 in the transmission-side device 101 will now be described.

As described above, the power supply circuit 2 generates a plurality of power supply voltages to be supplied to the function units in the transmission-side device 101. The configuration related to generation of the voltage VOUT will be described more specifically.

The power supply circuit 2 generates a voltage of a magnitude instructed by the setting voltage information TGT_VOUT and outputs it as the output voltage VOUT. Although not limited, a target voltage instructed by the setting voltage information TGT_VOUT is, for example, a voltage in the range of 0.5V to 18V. Therefore, the power supply circuit 2 varies the output voltage VOUT in the range of 0.5V to 18V in accordance with the setting voltage information TGT_VOUT and outputs the resultant voltage.

As described above, in the case of generating the output voltage in the wide range of 0.5V to 18V from fixed input voltage (for example, 20V) by the switching regulator, a fluctuation range of the input/output potential difference becomes large (for example, in the above case, the fluctuation range is 2V to 19.5V), so that it is difficult to stably control the switching regulator in all of input/output conditions. Consequently, in the case where a voltage to be output (target voltage) is relatively large (for example, 3.5V or larger), the power supply circuit 2 generates the output voltage VOUT by the switching regulator. In the case where the target voltage is relatively small (for example, less than 3.5V), the voltage is generated by the series regulator. Hereinafter, the internal configuration of the power supply circuit 2 will be described specifically.

Figure 3:
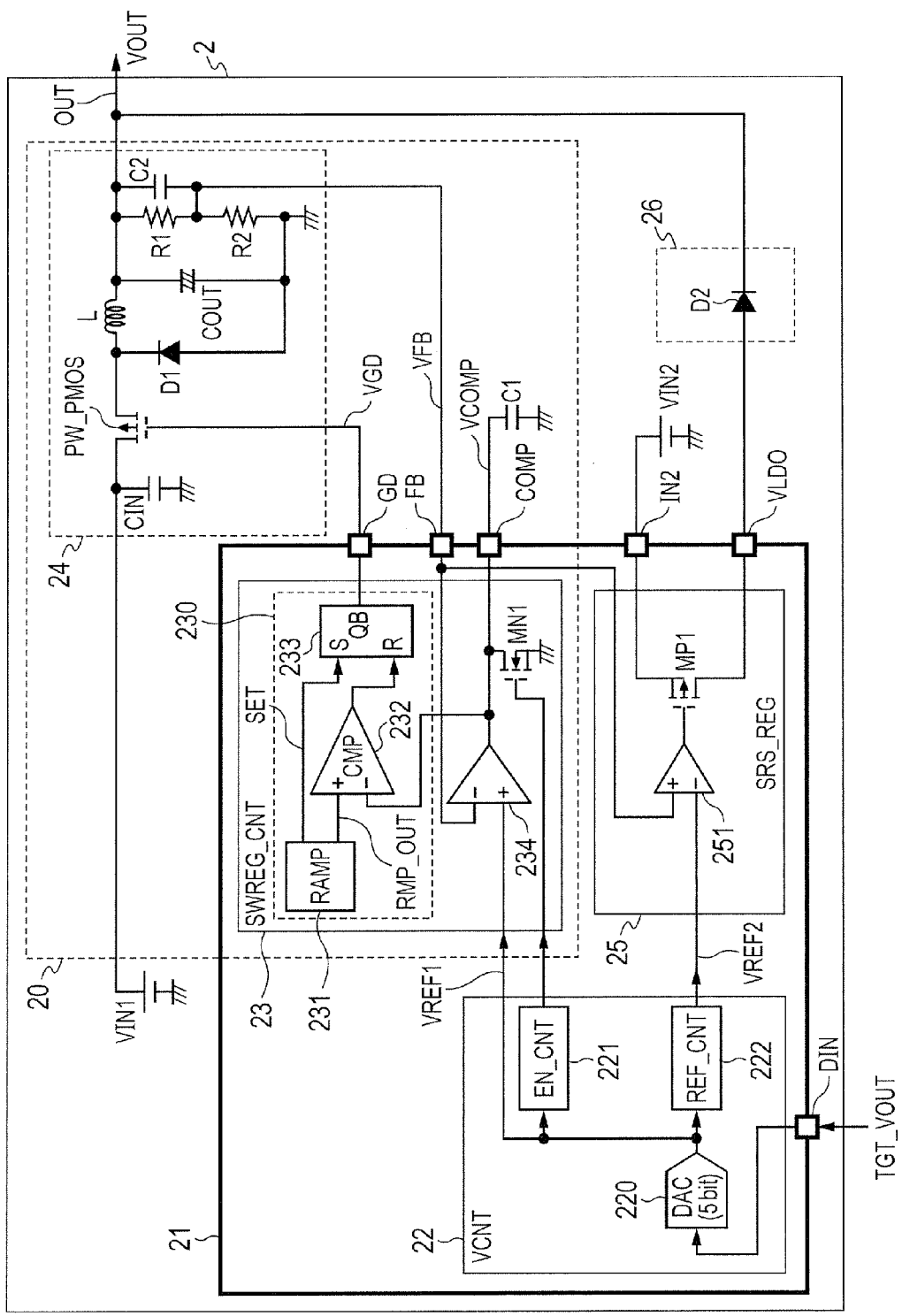
FIG. 3 is a block diagram illustrating a detailed configuration a power supply circuit 2 in a transmission-side device 101.

FIG. 3 is a block diagram illustrating a detailed configuration of the power supply circuit 2.

The power supply circuit 2 illustrated in the diagram includes a plurality of regulators for generating voltages and other peripheral circuits. In the diagram, only regulators for generating the voltage VOUT as the operation power supply voltage of the drive circuit 3 and peripheral circuits related to the regulators are illustrated. Concretely, a switching regulator 20, a series regulator 25, a backflow prevention circuit 26, and an output voltage control unit 22 are illustrated.

A main part in the power supply circuit 2 illustrated in the diagram is included as, although not limited, a semiconductor device formed on a single semiconductor substrate such as a silicon substrate by the known semiconductor integrated circuit manufacturing technique (for example, a CMOS process manufacturing technique). Hereinbelow, the part will be called a "power supply control IC". The power supply control IC 21 includes, for example, the series regulator 25 switching regulator control unit 23, and an output voltage control unit 22. The power supply control IC 21 is provided with, as external terminals, terminals DIN, VLDO, IN2, COMP, FB, and GD and other not-illustrated plural terminals (for example, a power supply terminal, a ground terminal, and the like).

The switching regulator 20 is, for example, a step-down-type switching regulator. Although not regulated, in FIG. 3, a non-isolated step-down switching regulator (step-down-chopper-type switching regulator) is illustrated. The switching regulator 20 generates, for example, a voltage in the range of 3.5V to 18V from the voltage VIN1 (for example, 20V) supplied from a power supply adaptor, a universal serial bus (USB), or the like.

The switching regulator 20 includes, for example, the switching, regulator control unit 23 and a voltage converter circuit 24. The voltage converter circuit 24 converts the DC input voltage VIN1 to DC voltage of desired magnitude, and outputs the resultant voltage to the node OUT. The voltage converter circuit 24 includes, for example, an input capacitor CIN, a switching element PW_PMOS, a diode D1, a coil L, an output capacitor COUT, resistors R1 and R2, and a capacitor C2. The input capacitor CIN is a stabilizing capacitor on the input side of the switching regulator 20. The output capacitor COUT is a stabilizing capacitor on the output side of the switching regulator 20. The switching element PW_PMOS is coupled between a node to which the input voltage VIN is supplied and the coil L. The switching element PW_PMOS is, for example, a P-channel-type power MOS transistor. The switching element PW_PMOS is on/off controlled by a PWM signal VGD output from the switching regulator control unit 23 which will be described later. By the operation, current flowing in the coil L is controlled, and a voltage lower than the input voltage VIN is generated at the node OUT. The resistors R1 and R2 are voltage dividing resistors for generating a feedback voltage VFB according, to the output voltage VOUT and are coupled in series between the node OUT and the ground node. A connection node of the resistors R1 and R2 is coupled to the terminal FB of the power supply control IC. The switching regulator control unit 23 and the series regulator 25 monitor the voltage at the node OUT by receiving the feedback voltage VFB obtained by dividing the output voltage VOUT.

The switching regulator control unit 23 generates a PWM signal VGD for controlling the switching element PW_PMOS in the voltage converter circuit 24 on the basis of the feedback voltage VFB. Concretely, the switching regulator control unit 23 is included by, for example, a PWM (Pulse Width Modulation) generation unit 230 and an error amplifier 234. The error amplifier 234 receives a reference voltage VREF1 corresponding to the target voltage to be output which is supplied from the output voltage control unit 22 to be described later and the feedback voltage VFB and generates and outputs a control signal VCOMP so that the error between the two input voltages is reduced. To the output node of the error amplifier 234, an external capacitor C1 for phase compensation s coupled via the terminal COMP. The PWM signal generation unit 230 generates a PWM signal on the basis of the control signal VCOMP which is output from the error amplifier 234. The PWM signal generation unit 230 includes, for example, a ramp signal generation circuit 231, a comparator circuit 232, and an SR lath circuit 233. The ramp signal generation circuit 231 generates a ramp signal (a saw tooth signal) RMP_OUT of predetermined frequency and, at the timing of the top point of the ramp signal, generates and outputs a one-shot signal SET. The comparator circuit 232 compares the ramp signal RMP_OUT and the control signal VCOMP and outputs a signal according to the comparison result. The SR latch circuit 233 receives the one-shot signal SET by a set terminal (S) and receives an output signal of the comparator circuit 232 by a reset terminal (R). A signal output from an inversion output terminal QB of the SR latch circuit 233 becomes a PWM signal VGD.

Figure 4:
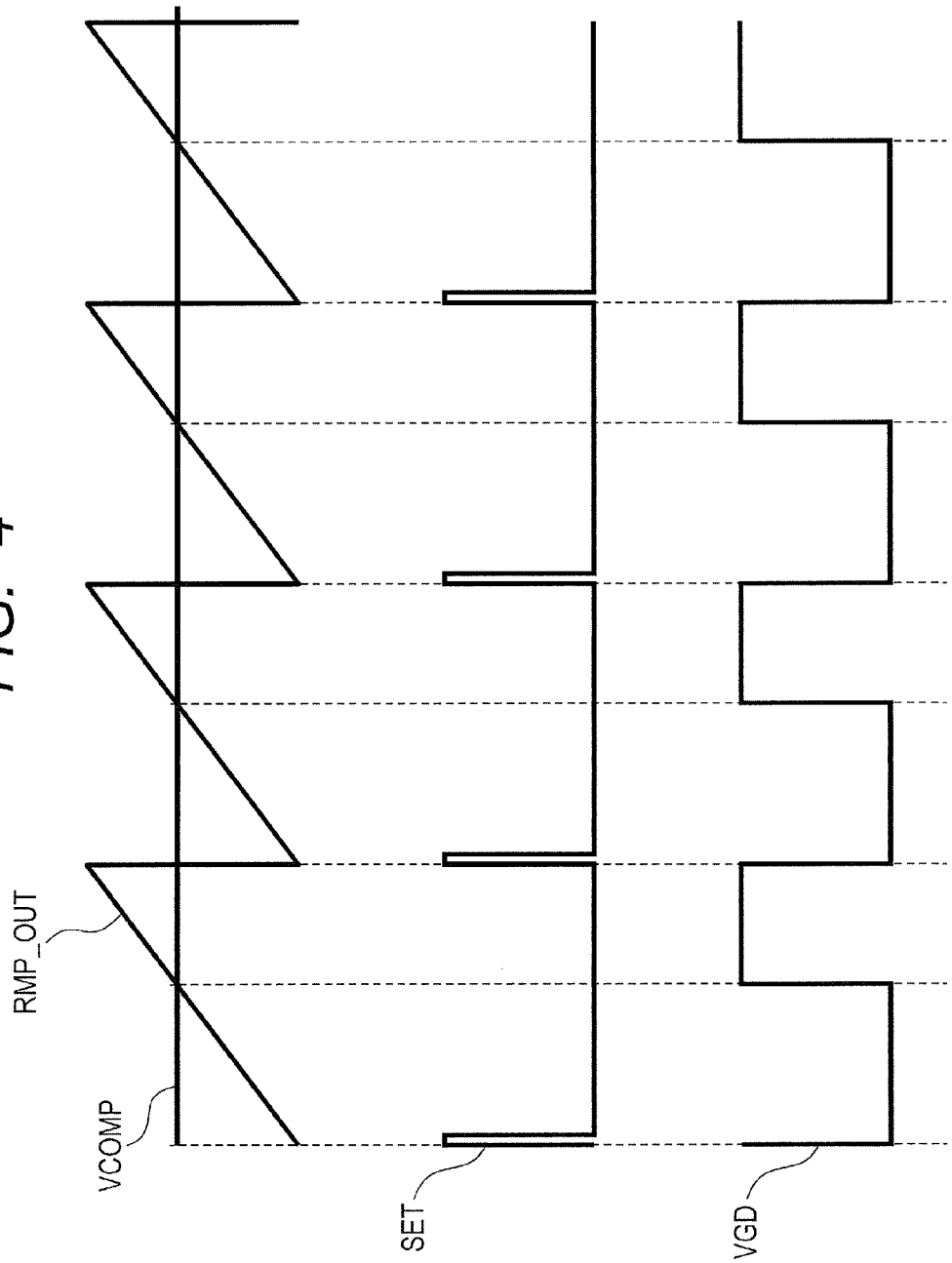
FIG. 4 is an explanatory diagram illustrating timings of voltages in a PWM signal generation unit 230.

FIG. 4 is an explanatory diagram illustrating timings of voltages in the PWM signal generation unit 230. As illustrated in the diagram, when the ramp signal RMP_OUT becomes larger than the control signal VCOMP, the PWM signal VGD is set to the high level. After that, when the ramp signal RMP_OUT reaches the top point, the one-shot signal SET is output. When the control signal VCOMP becomes larger than the ramp signal RMP_OUT, the PWM signal is set to the low level. By generating the signals in such a manner, the PWM signal VGD whose pulse width changes according to the magnitude of the control signal VCOMP as an output signal of the error amplifier 234 is generated. The PWM signal VGD is supplied to the gate terminal of the switching element PW_PMOS via a not-illustrated drive circuit or the like provided at the anterior or posterior stage of the terminal GD. In such a manner, the voltage at the node OUT is controlled to become the target voltage.

The series regulator 25 drops the voltage VIN2 supplied to the terminal IN2 by voltage drop and outputs the resultant voltage to the node OUT. The voltage VIN2 is a voltage lower than the input voltage VIN1 of the switching regulator 20 and is, for example, 5.0V. The series regulator 25 is, for example, an LDO (Low Drop Out) regulator and, generates, for example, a voltage of 0.5V to 3.0V from the input voltage VIN2 of 5.0V. In such a manner, a power loss in the series regulator 25 can be suppressed.

The series regulator 25 includes, for example, an error amplifier 251 and an output transistor MP1. The output transistor MP1 is, for example, a P-channel-type MOS transistor whose source is coupled to the terminal IN2 and, whose drain is coupled to the terminal VLDO. To the terminal IN2, the voltage VIN2 is supplied. The terminal VLDO is coupled to the node OUT via the backflow prevention circuit 26. In the case where the output voltage VOUT is higher than the voltage VIN2, the backflow prevention circuit 26 prevents backflow current from the node OUT to the node to which the voltage VIN2 supplied via the output transistor MP1. The backflow prevention circuit 26 is included by, for example, a diode D2 whose anode is coupled the terminal VLDO and whose cathode is coupled to the node OUT. The diode D2 is, although not limited, for example, a Schottky barrier diode. With the configuration, as compared with the case of using a switching element such as a transistor as the backflow prevention circuit 26, a control signal for controlling the switching element or the like becomes unnecessary. Thus, backflow prevention can be realized with a simple circuit configuration.

The error amplifier 251 receives the reference voltage VREF2 corresponding to the target voltage to be output which is supplied from the output voltage control unit 22 to be described later and a feedback voltage VFB and controls the gate voltage of the output transistor MP1 so that an error between the two input voltages decreases. With the configuration, the amount of current supplied from the output transistor MP2 toward the node OUT is adjusted so that the output voltage VOUT becomes the target voltage.

The output voltage control unit 22 controls the switching regulator control unit 23 and the series regulator 25 on the basis of the set voltage information TGT_VOUT received via the terminal DIN. Concretely, the output voltage control unit 22 generates the reference voltage VREF1 to be supplied to the switching regulator control unit 23 and the reference voltage VREF2 to be supplied to the series regulator 25 in accordance with the magnitude of the voltage instructed by the setting voltage information TGT_VOUT.

The output voltage control unit 22 includes for example, digital-to-analog conversion circuit (DAC) 220, a first control unit (EN_CNT) 221, and a second control unit (REF_CNT) 222.

The digital-to-analog conversion circuit (DAC) 220 converts the setting voltage information TGT_VOUT received via the terminal DIN to an analog signal. The setting voltage information TGT_VOUT includes, for example, information expressing a reference voltage for the target voltage of the output voltage VOUT, and the information, is, for example, a digital value of five bits. The analog signal converted by the digital-to-analog conversion circuit 220 is supplied as the reference voltage VREF1 to the first and second control units 221 and 222 and is also supplied to the error amplifier 234 in the switching regulator control unit 23.

The first control unit 221 controls generation and stop of voltage by the switching regulator 20 on the basis of the magnitude of the reference voltage VREF1. The first control unit 221 is included by, for example, a comparator circuit. For example, in the case where the reference voltage VREF1 is larger than the predetermined threshold voltage VTH, the first control unit 221 sets the switching regulator 20 into an enable state. In the case where the reference voltage VREF1 is smaller than the predetermined threshold, voltage VTH, the first control unit 221 sets the switching regulator 20 into a disable state.

The predetermined threshold voltage VTH is a reference voltage for switching between generation of the output voltage VOUT by the switching regulator 20 and generation of the output voltage VOUT by the series regulator 25. Although it is not limited, in the embodiment, it is assumed that the predetermined threshold voltage VTH is set to a voltage equal to the reference voltage VREF1 when the target voltage is 3.0V. For example, in the case where the reference voltage VREF1 corresponding to the target voltage in the range of 3.5V to 18V is received, the input reference voltage VREF1 becomes larger than the threshold voltage VTH, so that the first control unit 221 sets the switching regulator 20 to an enable state. On the other hand, in the case where the reference voltage VREF1 corresponding to the target voltage in the range of 0.5V to 3V is received, the input reference voltage VREF1 becomes smaller than the threshold voltage VTH, so that the first control unit 221 sets the switching regulator 20 into the disable state.

A control method for switching between the enable state and the disable state of the switching regulator 20 is not limited. FIG. 3 illustrates a method of controlling the on/off state of an N-channel-type MOS transistor MN1 provided between the output node of the error amplifier 234 in the switching regulator control unit 23 and the ground node by the first control unit 221. The disable state of the switching regulator 20 is, for example, that the switching element PW_PMOS of the voltage converter circuit 24 becomes an off state.

The second control unit 222 generates the reference voltage VREF2 of the error amplifier 251 of the series regulator 25 on the basis of the magnitude of the reference voltage VREF1. Concretely, in the case where the reference voltage VREF1 is larger than the predetermined threshold voltage VTH, the second control unit 222 generates and outputs the reference voltage VREF2 lower than the reference voltage VREF1. In the case where the reference voltage VREF1 is smaller than the predetermined threshold voltage VTH, the second control unit 222 outputs the reference voltage VREF1 as the reference voltage VREF2. For example, in the case where the reference voltage VREF1 corresponding to the target voltage in the range of 3.5V to 18V is received, the second control unit 222 generates and outputs the reference voltage VREF2 corresponding to the predetermined threshold voltage VTH (3.0V). In the case where the reference voltage VREF1 corresponding to the target voltage in the range of 0.5V to 3.0V is received, the second control unit 222 outputs the received reference voltage VREF1 as the reference voltage VREF2. In such a manner, in the case where the target voltage in the range of 0.5V to 3.0V is instructed, the series regulator 25 is controlled so that the output voltage VOUT becomes the target voltage. In the case where the target voltage in the range of 3.5V to 18V is instructed, the output voltage VOUT is controlled to become the target voltage (=3.0V) according to the predetermined threshold voltage VTH.

Figure 5:
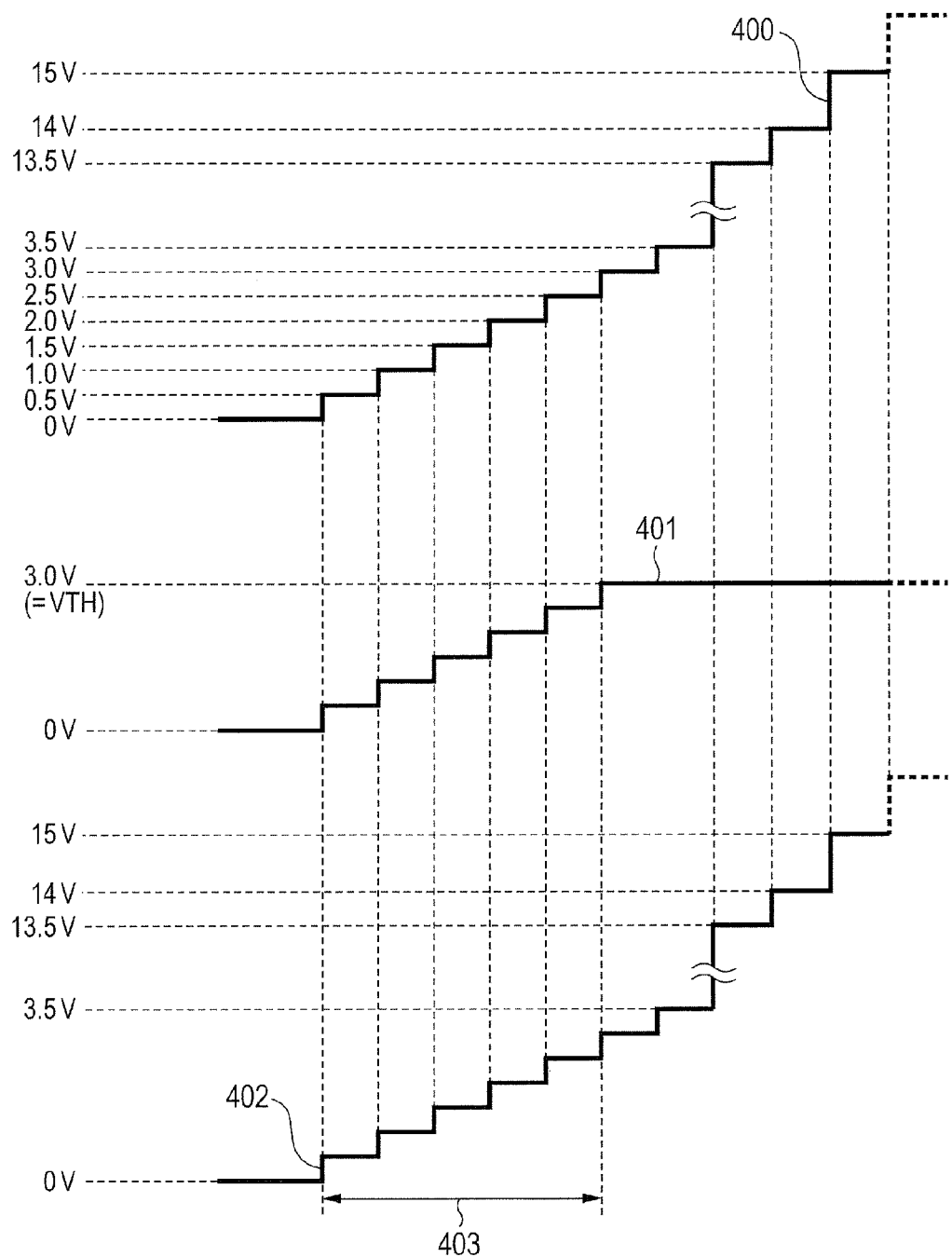
FIG. 5 is an explanatory diagram expressing reference voltages VREF1 and VREF2 with respect to target voltage of an output voltage VOUT.

FIG. 5 is an explanatory diagram expressing the reference voltages VREF1 and VREF2 with respect to the target voltage of the output voltage VOUT. In the diagram, reference numeral 400 denotes the target voltage of the output voltage VOUT, reference numeral 401 denotes the magnitude of the output voltage generated according to the reference voltage VREF2, and reference numeral 402 expresses the magnitude of the output voltage VOUT generated according to the reference voltage VREF1.

As illustrated in the diagram, in a range 402 where the target voltage is 0.5V to 3.0V the reference voltages VREF1 and VREF2 by which the output voltage VOUT becomes 0.5V to 3.0V are generated. In the range 403, as described above, the reference voltage VREF1 is lower than the predetermined threshold voltage VTH, the switching regulator 20 is set to the disable state, and the output voltage VOUT is generated by the series regulator 25. In the range where the target voltage is 3.5V or higher, as indicated by, the reference numeral 402, the reference voltage VREF1 by which the output voltage VOUT becomes 3.5V or higher in correspondence with the target voltage is generated. On the other hand, as indicated by the reference numeral 401, the reference voltage VREF2 is a clamped voltage corresponding to a predetermined threshold voltage VTH (3.0V).

By the control of the output voltage control unit 22, the switching regulator 20 and the series regulator 25 operate as follows.

For example, in the case where the target voltage in the range of 0.5V to 3.0V is instructed, the output voltage VCOMP of the error amplifier 234 is clamped to 0V by the first control unit 221, and switching of the switching element PW_PMOS in the voltage converter circuit 24 is stopped (off state). Consequently, generation of the output voltage VOUT by the switching regulator 20 is stopped. At this time, the reference voltage VREF2 corresponding to the target voltage is supplied to the series regulator 25, so that the output voltage VOUT in the range of 0.5V to 3.0V is generated by the series regulator 25. On the other hand, when the target voltage is 3.5V or higher, the operation limit of the error amplifier 234 is cancelled by the first control unit 221, and generation of the output voltage VOUT by the switching regulator 20 is allowed. At this time, the reference voltage VREF2 applied to the series regulator 25 is clamped to the voltage corresponding to the predetermined threshold voltage VTH (3.0V) regardless of the instructed target voltage, the error amplifier 251 controls the output transistor MP1 so that the error between the feedback voltage VFB and the reference voltage VREF2 becomes zero. For example, in the case where 8.0V is instructed as the target voltage, the output voltage VOUT of 8.0V is generated by the switching regulator 20. The feedback voltage VFB corresponding to the output voltage VOUT (8.0V) is supplied to the error amplifier 251 of the series regulator 25 via the terminal FB. Since the reference voltage VREF2 instructing 3.0V is received, the error amplifier 251 controls the gate voltage of the output transistor MP1 so that the output voltage VOUT becomes 3.0V from 8.0V. Concretely, the gate voltage of the transistor MP1 is increased so as to suppress current supply from the output transistor MP1 to the node OUT. For example, the gate voltage is increased so that the voltage between the gate and the source of the transistor MP1 becomes zero. By the operation, current supply from the transistor MP1 is stopped, so that voltage supply from the series regulator 25 to the node OUT is substantially stopped, and the output voltage VOUT is maintained by the switching regulator 20. At this time, although the output voltage VOUT (8.0V) is larger than the power supply voltage VIN2 (5.0V) of the series regulator 25, the backflow prevention circuit 26 exists between the terminal VLDO and the node OUT, so that backflow of current to the power supply voltage VIN2 via the output transistor MP2 is prevented.

FIG. 6 is an explanatory diagram illustrating communication timings at the time of wireless power supply in the wireless power supply system 100.

As illustrated in the diagram, first, at timing t0, the NFC control unit 1 instructs the power supply circuit 2 to generate the output voltage VOUT in the range of 0.5V to 3.0V to start the NFC. A voltage to be instructed in the range of 0.5V to 3.0V is preliminarily determined by, for example, the configuration or the like of the antenna 6 of the reception-side device 102 and the other peripheral circuits. At this time, the switching regulator 20 is set to the disable state, and the output voltage VOUT is generated by the series regulator 25. After the output voltage VOUT reaches the instructed target voltage, for example, at the timing t1, the NFC is started. Consequently, during the NFC, the output voltage VOUT is generated by the series regulator 25. There is consequently no possibility that switching noise caused by the switching regulator 20 is transmitted to a transmission/reception signal and communication is interrupted, and stability of the NFC can be increased. By the NFC for example, the battery residual amount information and other information is transmitted/received between the reception-side device 102 and the transmission-side device 101. After that, at timing t2, the NFC is stopped and shifted to a communication related to power transmission. The NFC control unit 1 grasps the residual amount of the battery 94 of the reception-side device 102 on the basis of the battery residual amount information and determines the amount of power transmitted in accordance with the residual amount. The NFC control unit 11 instructs the power supply circuit 2 to generate the output voltage VOUT according to the determined power amount in the voltage in the range of 3.5V to 18V. In such a manner as described above, the voltage output from the series regulator 25 is stopped, and the output voltage VOUT is generated by the switching regulator 20. After the output voltage VOUT reaches the instructed target voltage, for example, transmission of power is started at timing t3, and the battery 94 in the reception-side device 102 is charged. After that, at timing t4, transmission of power is temporarily interrupted, and is shifted to the NFC. Concretely, the NFC control unit 1 instructs the power supply circuit 2 to generate the output voltage VOUT in the range of 0.5V to 3.0V. When the output voltage VOUT reaches the target voltage, for example, at timing t5, the NFC is started. A period 500 sine the power transmission is stopped until the NFC is started is determined mainly by time since the voltage generation by the switching regulator 20 is switched to the voltage generation by the series regulator 25 until the output voltage VOUT is stabilized. As, described above, the power supply circuit 2 of the transmission-side device 101 does not stop the operation of the series regulator 25 when power is transmitted (for example, does not stop operation of the error amplifier 251) but applies the reference voltage VREF2 lower than the instructed target voltage to the error amplifier 251, thereby maintaining a state where the series regulator 25 does not substantially exert an influence on the output voltage VOUT. Therefore, as compared with the case of stopping the operation of the series regulator 25, the time since the voltage generation is switched to the voltage generation by the series regulator 25 until the output voltage VOUT is stabilized can be shortened. Thus, the period 500 since the power transmission is stopped until the NFC is started can be shortened, and it contributes to shortening of the general time necessary for the wireless power supply.

In the power supply circuit 2 of the first embodiment, in the range where the input/output potential difference of the switching regulator becomes small, voltage is generated by the switching regulator. In the range where the input/output potential difference of the switching regulator becomes large, voltage is generated by the series regulator. Consequently, as compared with the case of generating voltage under all of input/output conditions by the switching regulator, stabler variable control of the output voltage VOUT can be realized. Since the output voltage VOUT is generated by the series regulator 25 at the time of the NFC, there is no possibility that a transmission/reception signal is not influenced by switching noise, so that stabilized data communication can be performed.

Although the present invention achieved by the inventors herein has been concretely described on the basis of the embodiments, obviously, the present invention is not limited to the above but can be variously changed without departing from the gist of the invention.

For example, the case of setting the threshold voltage VTH for switching between the voltage generation by the switching regulator 20 and the voltage generation by the series regulator 25 to the voltage equal to the reference voltage VREF1 when the target voltage is set to 3.0V has been described, but the invention is not limited to the case. For example, the magnitude of the threshold voltage VTH may be changed according to the input/output voltage difference in which the stable operation of the switching regulator 20 is possible. For example, in the case where the range of the input/output voltage difference in which the stable operation of the switching regulator 20 is narrower than that in the example of the foregoing embodiment, it is sufficient to set the threshold voltage VTH to a higher voltage (for example, a voltage equal to the reference voltage VREF1 when the target voltage is 4.5V).

The condition of switching between the switching regulator 20 and the series regulator 25 and the condition of switching between power transmission and the NFC do not always have to be matched. For example, in the case of setting the threshold voltage VTH to 4.5V, generation of the output voltage VOUT by the series regulator 25 is performed from 0.5V to 4.5V, and generation of the output voltage VOUT by the switching regulator 20 is performed from 5.0V to 18V. On the other hand, the NFC is performed by the output voltage VOUT in the range of 0.5V to 3.0V, and power is transmitted by the output voltage VOUT in the range of 3.5V to 18V. Even if the regulator switching condition and the communication switching condition are made different as described above, stable variable control of the output voltage VOUT can be realized. At the time of the NFC, the output voltage is generated by the series regulator, so that stabilized data communication can be also realized.

Although the case of charging the battery 94 by wireless power supply has been described in the first embodiment, the invention is not limited to the case. The transmitted power may be used to drive another device (such as the electronic circuit (EC) 103). In this case, the transmission-side device 101 may receive, for example, information for determining a necessary power amount by the NFC and, on the basis of the information, determine the output voltage VOUT according to the amount of power to be transmitted.

Although the step-down chopper-type switching regulator has been described as an example of the switching regulator 20, the invention is not limited to the regulator but a switching regulator of another type may be used. For example, an insulation-type switching regulator may be used.

Although the case of supplying the voltage VIN2 different from the input voltage VIN1 of the switching regulator 20 has been described as the power supply voltage of the series regulator 25, when power loss by the series regulator 25 is permitted, the voltage VIN1 may be used as the power supply voltage of the series regulator 25.

Although the example of clamping the output voltage of the error amplifier 234 at the ground voltage (0V) has been described as the method of setting the switching regulator 20 to the enable state, another method may be employed as long as the switching of the voltage converter circuit 24 can be stopped. For example, the reference voltage to be applied to the error amplifier 234 may be clamped at 0V.

Although the circuit configuration that the backflow prevention circuit 26 is made by the diode D2 has been described, another circuit configuration may be also employed as long as backflow of current can be prevented.

The range of the function units formed on the single semiconductor substrate as the power supply control IC 21 is not limited to the range illustrated in FIG. 3. For example, the switching element PW_PMOS and the diode D2 may be provided in the power supply control IC 21, or the resistors R1 and R2, the capacitor C2, and the like may be provided internally.

What is claimed is:

1. A power supply unit capable of changing dynamic output voltage comprising:
   a first node for outputting the output voltage;
   a first regulator for dropping down input voltage by a switching method and outputting a resultant voltage to the first node;
   a second regulator for dropping down the input voltage by a voltage drop and outputting the resultant voltage to the first node; and
   an output voltage control unit for controlling the first and second regulators in accordance with first information instructing a target voltage of the output voltage,
   wherein when the target voltage instructed by the first information is larger than a predetermined threshold voltage, the output voltage control unit controls the first regulator so that the voltage of the first node becomes the target voltage and stops supply of voltage from the second regulator and, when the target voltage is smaller than the predetermined threshold voltage, output voltage control unit controls the second regulator so that the voltage of the first node becomes the target voltage and stops supply of voltage from the first regulator, and
   wherein the second regulator comprises
     an output transistor supplying current to the first node; and
     an error amplifier receiving a feedback voltage and a reference voltage based on the voltage of the first node and controlling current supply by the output transistor so that an error between the two input voltages decreases,
   wherein the output voltage control unit generates the reference voltage according to a voltage lower than the target voltage in the case where the instructed target voltage is larger than the predetermined threshold voltage, and generates the reference voltage according to the target voltage in the case where the instructed target voltage is smaller than the predetermined threshold voltage.

2. The power supply unit according to claim 1,
wherein the first regulator drops down a first input voltage and outputs the resultant voltage, and
the second regulator drops down a second input voltage lower than the first input voltage and outputs the resultant voltage.

3. The power supply unit according to claim 2,
wherein the second regulator outputs a voltage to the first node via a diode which is biased in a forward direction.

4. The power supply unit according to claim 1,
wherein in the case where the instructed target voltage is larger than the predetermined threshold voltage, the output voltage control unit generates the reference voltage according to the predetermined threshold voltage.

5. The power supply unit according to claim 1,
wherein the first regulator comprises:
a voltage converter circuit controlling current to be supplied to an inductor by a switching element to thereby generate a voltage lower than an input voltage and output the resultant voltage; and
a switching control unit controlling an on/off state of the switching element, and
wherein the output voltage control unit controls the switching control unit so as to turn off the switching element to thereby stop output of voltage from the first regulator.

6. A wireless communication device capable of performing communication by switching transmission/reception of data and power transmission, comprising:
an antenna;
a drive circuit generating a drive signal for driving the antenna;
a matching circuit for impedance matching between the antenna and an antenna on a reception device side;
a power supply unit according to claim 1; and
a data process control unit for controlling the communication,
wherein for transmitting data via the antenna, the data process control unit supplies the first information instructing a target voltage smaller than the predetermined threshold voltage to the power supply unit, and for transmitting power via the antenna, the data process control unit gives the first information instructing the target voltage larger than the predetermined threshold voltage to the power supply unit, and
the drive circuit generates the drive signal according to the voltage output from the power supply unit.

7. The wireless communication device according to claim 6,
wherein the data process control unit includes a microcontroller.

8. A semiconductor device comprising:
a switching control unit generating a control signal for controlling an on/off state of a switching circuit in a step-down-type switching regulator;
a series regulator; and
an output voltage control unit for controlling the switching control unit and the series regulator in accordance with first information instructing a target voltage to be output,
wherein when the target voltage instructed by the first information is larger than a predetermined threshold voltage, the output voltage control unit generates the control signal so that output voltage of the switching regulator becomes the target voltage and stops supply of voltage from the series regulator, and when the target voltage is smaller than the predetermined threshold voltage, the output voltage control unit generates the control signal to control the series regulator so that output voltage of the series regulator becomes the target voltage and to stop generation of voltage by the switching regulator, and
wherein the series regulator comprises
an output transistor driving a load; and
an error amplifier receiving a feedback voltage according to the output voltage and a reference voltage and controlling the output transistor so that an error between the two input voltages decreases,
wherein the output voltage control unit generates the reference voltage according to a voltage lower than the target voltage in the case where the instructed target voltage is larger than the predetermined threshold voltage, and generates the reference voltage according to the target voltage in the case where the instructed target voltage is smaller than the predetermined threshold voltage.

9. The semiconductor device according to claim 8,
wherein in the case where the instructed target voltage is larger than the predetermined threshold voltage, the output voltage control unit generates the reference voltage according to the predetermined threshold voltage.

10. The semiconductor device according to claim 8,
wherein the series regulator drops a voltage lower than an input voltage of the switching regulator and outputs the resultant voltage.

11. The power supply unit according to claim 1, wherein the output voltage control unit comprises a first control unit and a second control unit for respectively controlling the first and second regulators.

12. The semiconductor device according to claim 8, wherein the output voltage control unit comprises a first control unit and a second control unit for respectively controlling the switching control unit and the series regulator.

* * * * *